United States Patent
Emmert et al.

(10) Patent No.: US 11,028,461 B2
(45) Date of Patent: Jun. 8, 2021

(54) BAUXITE RESIDUE RECYCLING

(71) Applicant: Worcester Polytechnic Institute, Worcester, MA (US)

(72) Inventors: Marion H. Emmert, Worcester, MA (US); Remya P. Narayanan, Worcester, MA (US)

(73) Assignee: Worcester Polytechnic Institute, Worcester, MA (US)

( * ) Notice: Subject to any disclaimer, the term of this patent is extended or adjusted under 35 U.S.C. 154(b) by 284 days.

(21) Appl. No.: 16/030,041

(22) Filed: Jul. 9, 2018

(65) Prior Publication Data
US 2019/0040494 A1 Feb. 7, 2019

Related U.S. Application Data

(60) Provisional application No. 62/504,703, filed on May 11, 2017.

(51) Int. Cl.
| | | |
|---|---|---|
| *C22B 59/00* | (2006.01) | |
| *C22B 7/00* | (2006.01) | |
| *C22B 3/44* | (2006.01) | |

(52) U.S. Cl.
CPC ............. *C22B 59/00* (2013.01); *C22B 3/44* (2013.01); *C22B 7/002* (2013.01); *C22B 7/007* (2013.01)

(58) Field of Classification Search
CPC ........... C22B 59/00; C22B 3/44; C22B 7/002; C22B 7/007
See application file for complete search history.

(56) References Cited

U.S. PATENT DOCUMENTS

| | | | |
|---|---|---|---|
| 5,015,447 A | 5/1991 | Fulford et al. | |
| 5,030,424 A | 7/1991 | Fulford et al. | |
| 2016/0153070 A1* | 6/2016 | Duyvesteyn | C01G 49/14 |
| | | | 75/743 |
| 2016/0153071 A1* | 6/2016 | Boudreault | C01G 43/01 |
| | | | 75/743 |

OTHER PUBLICATIONS

"Thermodynamic Characterization of the Amphoterism of Hydroxides and Oxides of Scandium Subgroup Elements in Aqueous Media" (Russian Journal of Applied Chemistry, 2009, vol. 82, No. 12, pp. 2098-2104. © Pleiades Publishing, Ltd., 2009 (Year: 2009).*
"Selective Process Steps for the Recovery of Scandium from Jamaican Bauxite Residue (Red Mud)" (ACS Sustainable Chem. Eng. 2018, 6, 1478-1488) (Year: 2018).*

* cited by examiner

*Primary Examiner* — Christopher S Kessler
*Assistant Examiner* — Jiangtian Xu
(74) *Attorney, Agent, or Firm* — Armis IP Law, LLC

(57) ABSTRACT

Recovery of scandium from mined red mud includes adding an acid to a quantity of red mud for converting oxides in the red mud, and roasting the quantity of red mud for decomposing compounds having low thermal stability, typically iron and titanium. Water is added to the roasted red mud for leaching the converted oxides into a leach liquor mixture including scandium and other dissolved rare earths, and the leach liquor mixture is agitated by sonication or ball milling to increase an exposed surface area of red mud particles in the leach liquor. PH of the leach liquor is adjusted to precipitate the rare earths while leaving the scandium in solution in the leach liquor, followed by precipitating the separated scandium oxalate remaining in the leach liquor by reducing the pH and adding oxalic acid. Precipitated scandium oxalate may then be filtered from the leach liquor.

18 Claims, 4 Drawing Sheets

BAUXITE RESIDUE RECYCLING

RELATED APPLICATIONS

This patent application claims the benefit under 35 U.S.C. § 119(e) of U.S. Provisional Patent App. No. 62/504,703, filed May 11, 2017, entitled "METHOD OF RECOVERY OF SCANDIUM FROM BAUXITE RESIDUE," incorporated herein by reference in entirety.

STATEMENT OF FEDERALLY SPONSORED RESEARCH OR DEVELOPMENT

This invention was made with government support under contract Nos. IIP-0968839 and IIP-1464560 awarded by the National Science Foundation. The government has certain rights in the invention

BACKGROUND

Bauxite residue, also known as "red mud," is a by-product of aluminum production, and in conventional approaches is typically discarded. Red mud is often dumped as waste, which has triggered environmental concerns in recent years. Red mud, however, contains small quantities of rare earths which have traditionally been thought of as infeasible for recovery. However, international export restrictions of rare earths, coupled with an increased need of certain rare earths used in aluminum production, have contributed to a perception of a future need for rare earths.

SUMMARY

A recovery and recycling process for red mud yields scandium and other rare earths present in red mud, which had traditionally been discarded as a waste product of aluminum production. Scandium, as well as other rare earths, are expected to enjoy increased demand as a surge in electric vehicle production looks to aluminum as a lightweight substitute for steel. A recycling process that avoids solvents and harmful emissions recovers about 75% of scandium present in red mud in a substantially pure form as scandium oxalate. Sulfation of red mud extracted from a waste stream converts most rare earths, including scandium, to sulfates. Roasting in a tube furnace converts low thermal stability sulfates, such as titanium and iron, to oxides. Water leaching combined with physical agitation such as sonication or ball milling generates a leach liquor with the remaining rare earths including scandium. Precipitation of rare earths other than scandium is performed from addition of sodium hydroxide to adjust the pH to 8, which leaves only scandium as filtrate as the remainder are separated by filtration. Sulfuric acid is added to the scandium rich filtrate to reduce the pH to 1, and scandium oxalate is precipitated by addition of oxalic acid.

Configurations herein are based, in part, on the observation that rare earths including scandium have been discarded in bauxite reside (red mud) as a by-product of aluminum production. Unfortunately, conventional approaches to red mud recycling suffer from the shortcoming that valuable rare earths exist in sparse quantities in red mud, requiring expensive and/or environmentally adverse processes for recovering relatively small quantities. Accordingly, configurations herein provide a solvent free approach to recovery of scandium by roasting to remove substantially all iron and titanium, and sonication-based leaching of the remaining rare earths, followed by precipitation of all but scandium and finally precipitation of the scandium remaining in solution.

In further detail, the disclosed approach for recovering scandium from mined red mud includes adding an acid to a quantity of red mud for converting oxides in the red mud, and roasting the quantity of red mud for decomposing compounds having low thermal stability, typically iron and titanium. Water is added to the roasted red mud for leaching the converted oxides into a leach liquor mixture including scandium and other dissolved rare earths, and agitating the leach liquor mixture by sonication or ball milling to increase an exposed surface area of red mud particles in the leach liquor. PH of the leach liquor is adjusted to precipitate the rare earths while leaving the scandium in solution in the leach liquor, followed by precipitating the separated scandium oxalate remaining in the leach liquor by reducing the pH and adding oxalic acid. Precipitated scandium oxalate may then be filtered from the leach liquor as product.

BRIEF DESCRIPTION OF THE DRAWINGS

The foregoing and other features will be apparent from the following description of particular embodiments disclosed herein, as illustrated in the accompanying drawings in which like reference characters refer to the same parts throughout the different views. The drawings are not necessarily to scale, emphasis instead being placed upon illustrating the principles of the invention.

DETAILED DESCRIPTION

Depicted below is an example of scandium recovery from red mud in an example configuration. The example configuration is based on a specific quantity of red mud, however the process and results are scalable and extendable to arbitrary quantities. It is notable that the example configuration employs no solvents or high emissions smelting or similar high emission discharge steps. Rather, the disclosed approach employs selective recovery of scandium from red mud using a roasting-leaching-precipitation process. Further, intermediate stages also yield recovery of iron and titanium, and recovery of other rare earths outlined below, all present in the red mud.

Figure 1:
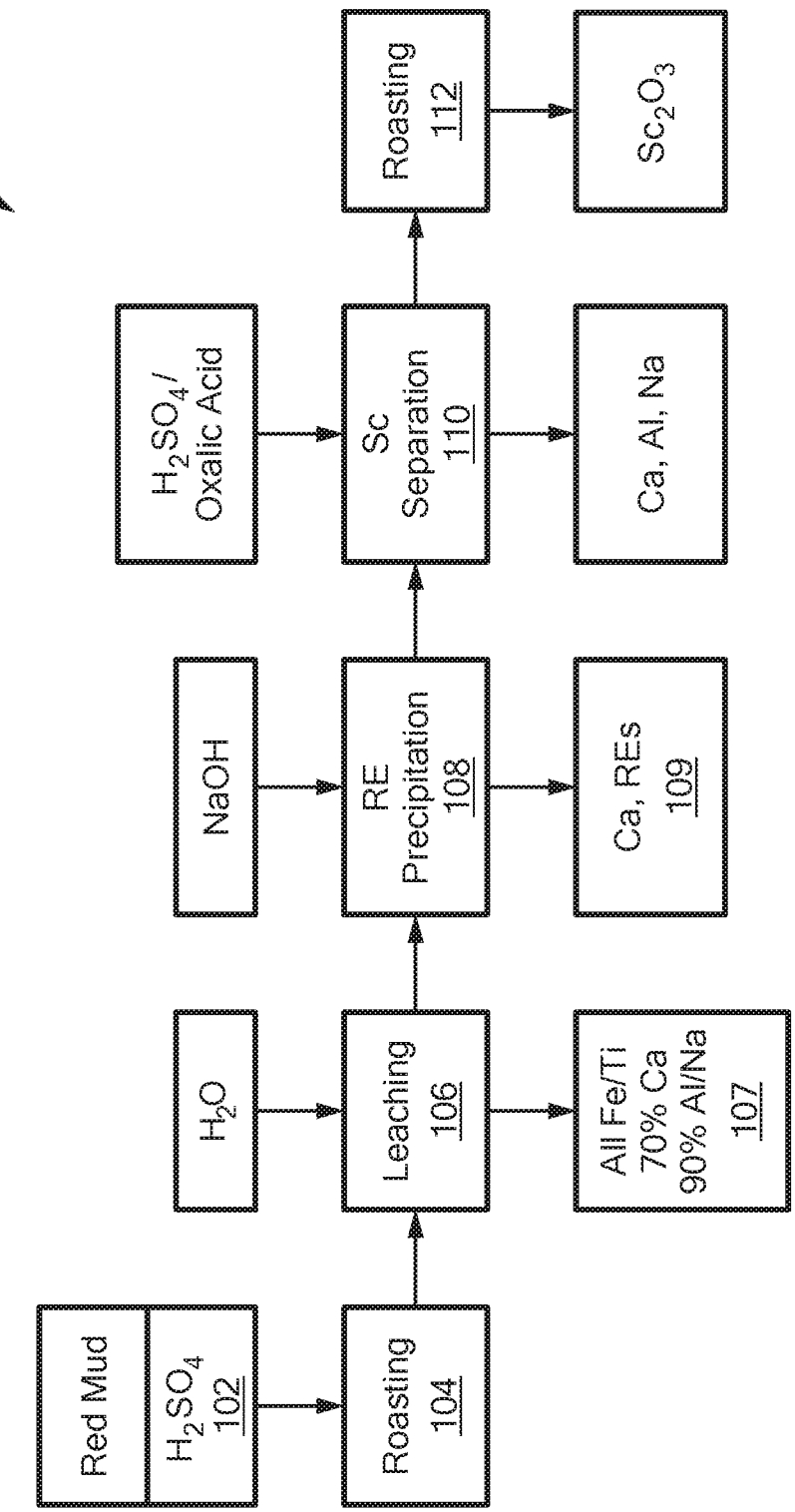
FIG. 1 is a context diagram of scandium recovery as disclosed herein.

FIG. 1 is a context diagram of scandium recovery as disclosed herein. FIG. 1 outlines an example process allowing the selective, sustainable recovery of scandium (Sc) with 75% efficiency from Jamaican bauxite residue (red mud) gathered as a waste product from aluminum production. The process design is based on green chemistry principles and focuses on establishing highly selective process steps (sulfation, leaching, and precipitation) in order to minimize costs and waste produced. In addition to scandium oxide, the chosen approach produces mixed rare earth oxides as a side product, thus isolating an average of 88% of rare earth elements contained in the red mud.

FIG. 1 summarizes a sequence 100 of optimized process steps, in which each step relies on selective separations. This results in a highly efficient, 4-step separation of Sc as $Sc_2O_3$ from the red mud (RM). The key to developing this rapid separation sequence is the optimization of each step and the separation of bulk elements by ball-mill accelerated leaching of rare earths (Res) early on in the process. The overall recovery efficiency of Sc is 75%, as calculated based on the original Sc content of the red mud quantity and the obtained amount of $Sc_2O_3$.

Referring to FIG. 1, step 102 depicts sulphation of red mud at 120° C. using a ratio of red mud to sulfuric acid to water of 1:0.8:0.4 for about 18 hours to convert substantially all oxides to respective sulfates. Step 104 performs roasting of the sulphated red mud at 700° C. for 1 hr., to decompose sulfates with low thermal stability. This is followed by selective leaching of rare earths by ball milling for 30 min., using water at room temperature, as disclosed at step 106. Iron and titanium are removed at this step, as depicted at 107. Sonication may also be employed, discussed below. Selective precipitation/separation of the other associated rare earth elements occurs at pH=8, as depicted at step 108, separating rare earths other than scandium, as depicted at step 109. From the scandium remaining in solution, pH is manipulated by sulfuric and oxalic acids for separation of scandium as oxalate from the filtrate, as shown at step 110. Roasting of the precipitate to obtain $Sc_2O_3$ is then performed in a tube furnace, as depicted at step 112.

Figure 2:
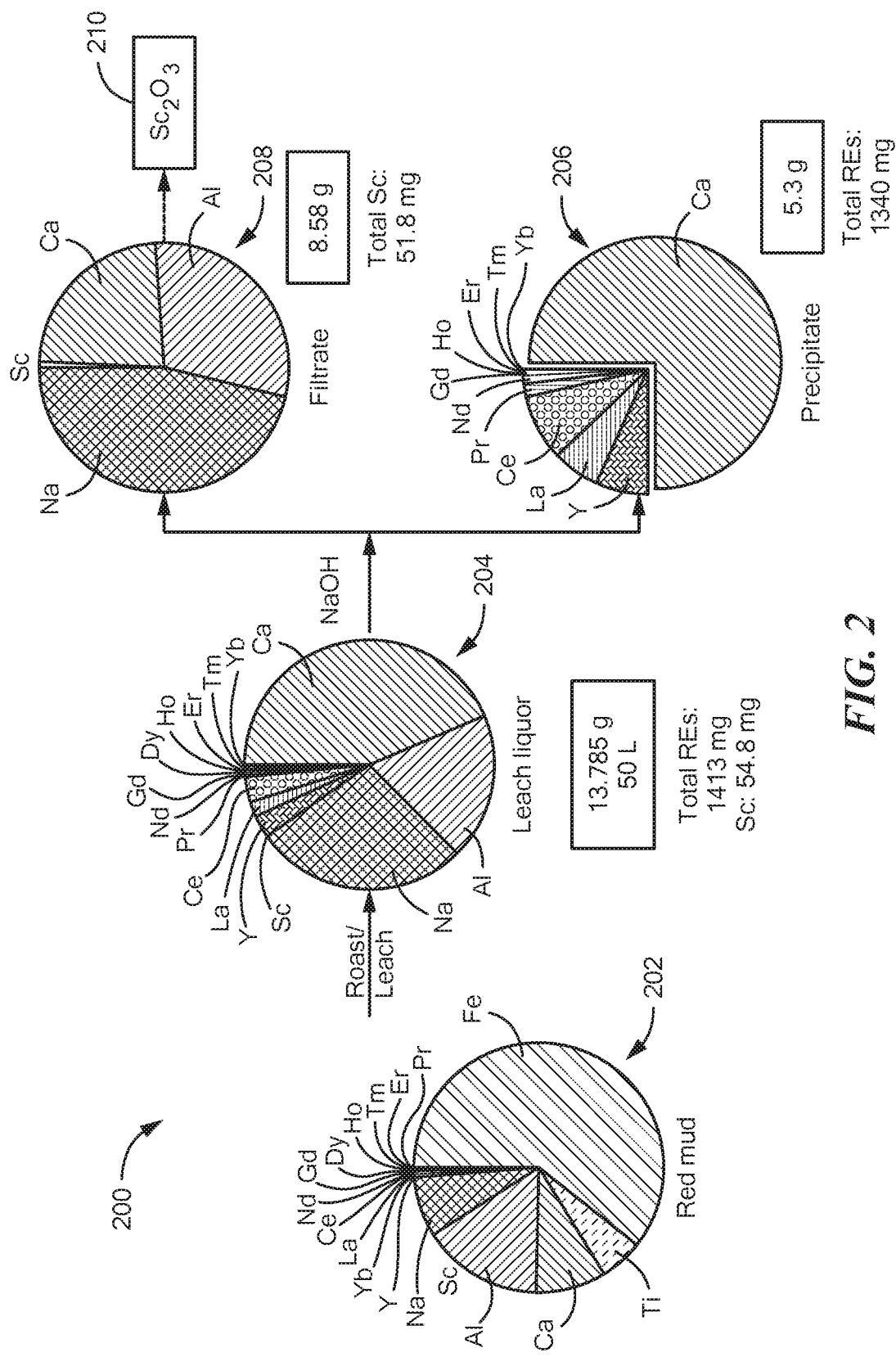
FIG. 2 shows products of selective leaching to isolate scandium in the sequence of FIG. 1.

FIG. 2 shows products 200 of selective leaching to isolate scandium in the sequence of FIG. 1. Referring to FIGS. 1 and 2, the disclosed method for recovering scandium from mined red mud includes adding an acid to a quantity of red mud for converting oxides in the red mud, the composition of which is shown at 202. The graph 204 shows the composition following roasting the quantity of red mud for decomposing compounds having low thermal stability. It can be noted that iron and titanium have been removed. In the example configuration, this includes adding sulfuric acid to the red mud for converting oxides in the red mud to sulfates, in which the sulfates include iron, titanium and scandium. Roasting extracts iron oxide and titanium oxide from the roasted red mud, while the scandium remains with the other rare earths as metal sulfates. Sulphation and roasting results in undetectable levels of iron and titanium upon forming a leach liquor mixture, such that the levels are less than 5 ppm. Water is added to the roasted red mud for leaching the converted oxides (sulfates, in this case) into a leach liquor mixture including scandium and rare earths, shown by graph 204. It will be further noted that the Sc remains a relatively small portion of the graph 204. Scandium is, nonetheless, recoverable in feasible quantities to justify the process. Consideration of the other rare earths also attests to viability of the process.

The leach liquor is formed by agitating the leach liquor mixture to increase an exposed surface area of red mud particles in the leach liquor. This is followed by adjusting the pH of the leach liquor to precipitate the rare earths in graph 206 while leaving the scandium in solution in the leach liquor, shown in graph 208. PH adjustment is performed by sodium hydroxide followed by sulfuric acid in the example configuration, however other pH adjustment substances may be employed. Precipitation of scandium oxalate 210 from the leach liquor is performed by reducing the pH and adding oxalic acid, and filtering the precipitated scandium oxalate from the leach liquor.

Figure 3:
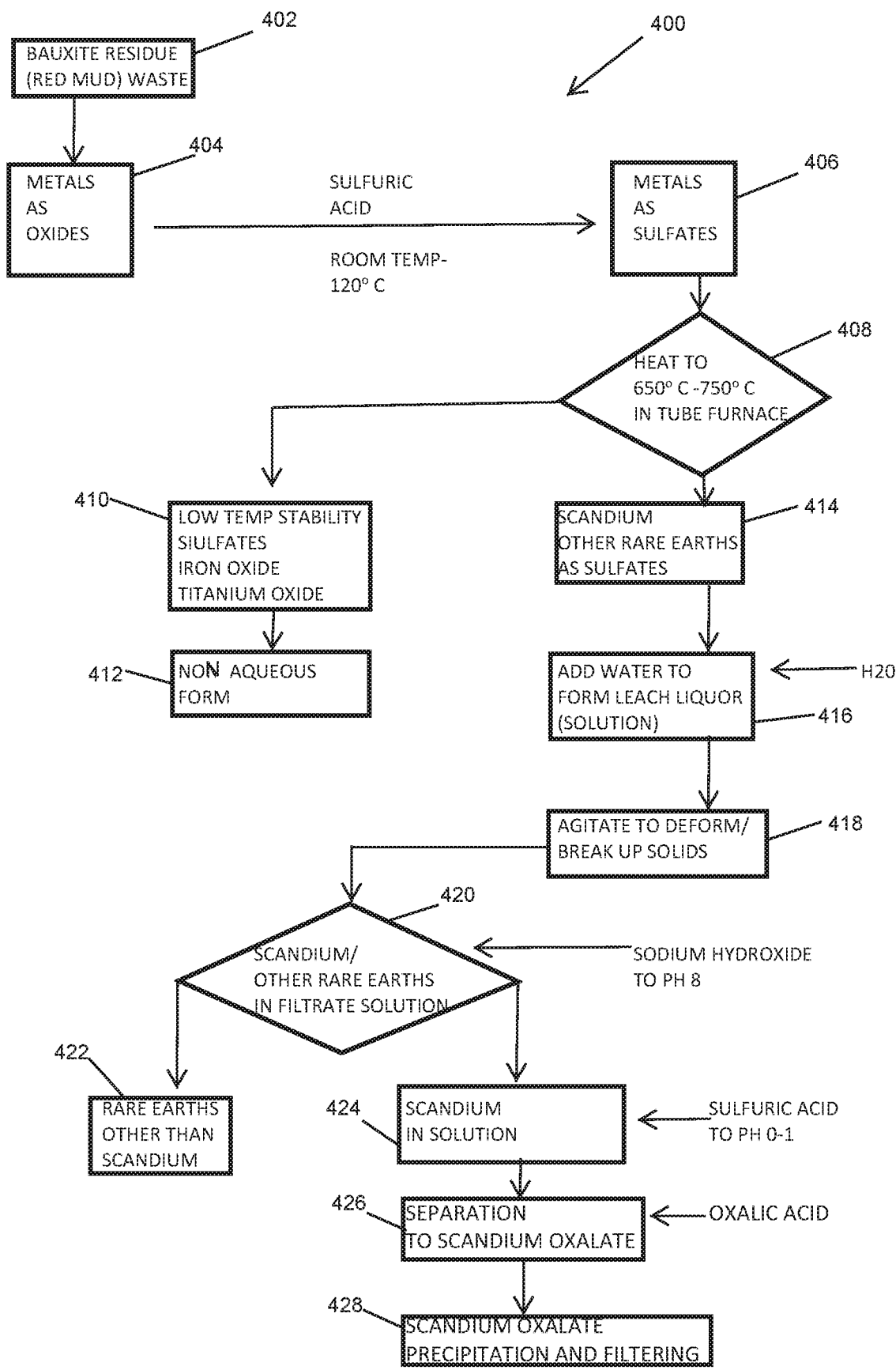
FIG. 3 shows a flowchart of scandium recovery using leaching as in FIG. 2.

FIG. 3 shows a flowchart 400 of scandium recovery using leaching as in FIG. 2. Referring to FIGS. 1-3, an example procedure for execution of the disclosed approach of FIG. 1 for providing the separation and yield of FIG. 2 is shown. A gathered quantity of red mud previously verified for elemental content is provided, as depicted at step 402. This quantity contains unrefined metals as oxides, as shown at step 404, prior to sulfation and roasting. The sulfation (acid mixing) of red mud includes adding an acid to a quantity of red mud for converting oxides in the red mud. In the example shown, this is performed by moistening the quantity of dried red mud with 40 wt % water (0.20 mL) and 80 wt % concentrated $H_2SO_4$ (0.40 g, 0.22 mL) in an alumina crucible. Other suitable acids may be employed. The mixture was then heated between room temperature to 120° C. for about 14 hours in a vacuum oven until completion of sulfation, as disclosed at step 406. The sulfated RM was then roasted at between 650° C.-750° C., as depicted at step 408, or preferably around 700° C., for 1 hour in a tube furnace to decompose low thermal stability sulfates to oxides, shown at step 410. This separates the low temperature stability oxides of iron and titanium in a non-aqueous form, as shown at step 412.

Following step 408, scandium and other rare earths remain as sulfates, as shown at step 414. Addition of water to the obtained residue results in leaching the converted oxides into a leach liquor mixture including scandium and rare earths (step 416), followed by agitation such as ball milling or sonication at step 418. Agitating the leach liquor mixture causes an increase an exposed surface area of red mud particles in the leach liquor. Ball milling may be performed at 3000 rpm using glass balls, for 30 min, sonication for around 5 hours, or other suitable physical agitation.

An analysis of the composition of the leach liquor indicates the leaching of 84% Sc, 0% Fe, 8.2% Al, 0% Ti, 35% Ca, 100% Y, 100% La, 98% Ce, 100% Pr, 99% Nd, 100% Gd, 100% Dy, 68% Er, and 100% Yb of the initial red mud quantity. Sodium hydroxide is added to the leach liquor for performing mixed rare earth oxide precipitation for separating scandium. The pH of the leach liquor is adjusted to pH 8 using 2 M NaOH, as depicted at step 420. The mixed rare earth precipitate formed through pH adjustment is removed by filtration and contains all rare earths but Sc (Y, La, Ce, Pr, Nd, Gd, Dy, Er, and Yb), as shown at step 422, are separated as a precipitate and substantially all Sc remains in solution in the filtrate solution at step 424. Addition of concentrated $H_2SO_4$ to the scandium in solution brings the pH between 0-1 to separate the scandium into scandium oxalate at step 426. Scandium oxalate is precipitated by adding solid oxalic acid, as depicted at step 428. Analysis reveals only <1% Sc left in the filtrate, with the overall Sc recovery calculated to be 75%, based on the amount of Sc originally present in the quantity of red mud.

Figure 4:
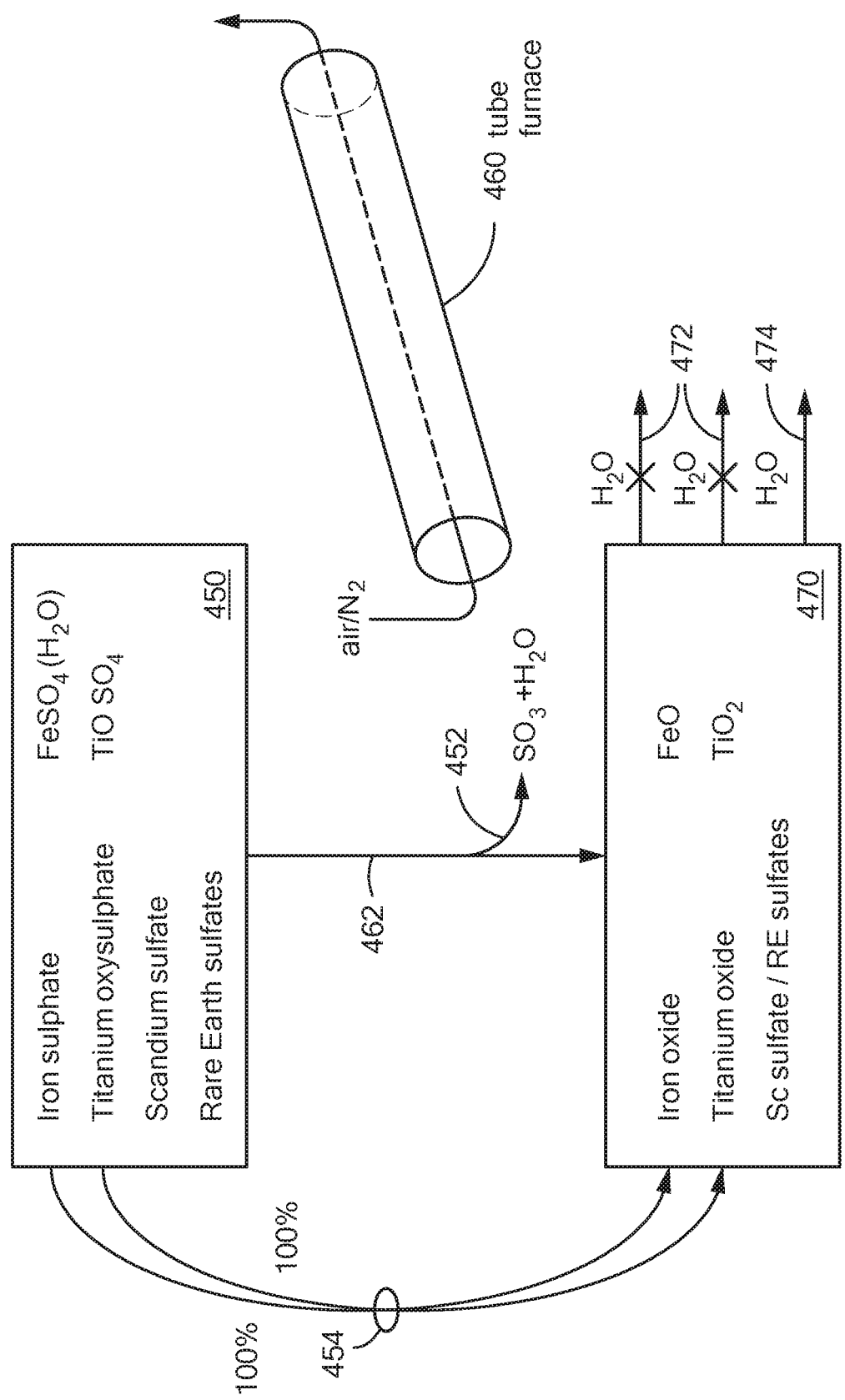
FIG. 4 shows isolation of titanium, iron and rare earths as in FIG. 3 in greater detail.

FIG. 4 shows isolation of titanium, iron and rare earths as in FIG. 3 in greater detail. Referring to FIGS. 3 and 4, roasting the quantity of red mud for decomposing compounds having low thermal stability performs separation of substantially all iron and titanium. Roasting includes heating at least until iron sulfate and titanium oxysulfate form iron oxide and titanium oxide, respectively, and scandium sulfate and rare earth sulfates remain in solution. At step 406, a containment 450 includes metals in the form of sulfates, including $FeSO_4$ and $TiOSO_4$. Alternatively, other sulfur forms of the low temperature stability compounds may be formed, The sulfated red mud quantity is transferred to a tube furnace 460 at around 700° C. Roasting occurs in the tube furnace 460 for extracting sulfur trioxide and water vapors. Air/oxygen current in the tube furnace 460 cause the extracted sulfur trioxide to be unavailable for combination with the iron and titanium. The tube furnace 460 provides a steady current of air and oxygen (either atmospheric or supplied) for exhausting $SO_3$ and water vapor, shown by arrow 452. The combined sulphation and roasting results in undetectable levels (less than 5 ppm) of iron and titanium upon forming the leach liquor mixture, as shown by arrow 454. It is noted that the tube furnace exhausts sulphur gases, which may favor the conversion to oxides, rather than recombination to sulfur forms based on a lack of available sulfur.

The roasting yield 470 from the tube furnace 460 is shown by arrow 462. Titanium and iron are substantially completely converted to non-aqueous forms 472, while scandium and other rare earths remain in solution 474. Table I shows elements present and the corresponding temperature at which oxide conversion occurs. Titanium and iron convert at relatively low temperatures, while scandium begins to form oxides at 700° C., suggesting a small temperature window for selective scandium conversion.

TABLE I

| Metal Sulfate | Onset Temperature for Sulfate to Oxide Conversion |
| --- | --- |
| $Fe_2(SO_4)_3$ | 545° C. |
| $TiOSO_4$ | 340° C. |
| $CaSO_4$ | >1000° C. |
| $Na_2SO_4$ | 870° C. |
| $Al_2(SO_4)_3$ | 524° C. |
| $Sc_2(SO_4)_3$ | 700° C. |
| $Y_2(SO_4)_3$ | 850° C. |
| $La_2(SO_4)_3$ | 840° C. |
| $Ce_2(SO_4)_3$ | 666° C. |
| $Nd_2(SO_4)_3$ | 800° C. |

It is interesting to note that the average RE recovery declines steeply at temperatures higher than 715° C., while Fe recovery is very low when roasting is performed at temperatures higher than 700° C. Therefore, a range between 700-715° C. may be the most suitable temperature for selective RE recovery. Importantly, Sc recovery remains quantitative up to 715° C. but falls to less than 20% when roasting is performed at 750° C. This is likely due to the decomposition of $Sc_2(SO_4)_3$ under these roasting conditions; however, the demonstrated quantitative recovery of Sc up to a roasting temperature of 715° C. is a significant advancement over conventional approaches.

While the system and methods defined herein have been particularly shown and described with references to embodiments thereof, it will be understood by those skilled in the art that various changes in form and details may be made therein without departing from the scope of the invention encompassed by the appended claims.

What is claimed is:

1. A method for recovering scandium from mined red mud, comprising:
   adding an acid to a quantity of red mud for converting oxides in the red mud;
   roasting the quantity of red mud;
   adding water to the roasted red mud for leaching the converted oxides into a leach liquor mixture including scandium and rare earths;
   agitating the leach liquor mixture to increase an exposed surface area of red mud particles in the leach liquor;
   adjusting the pH of the leach liquor to precipitate the rare earths while leaving the scandium in solution in the leach liquor;
   precipitating scandium oxalate from the leach liquor by reducing the pH and adding oxalic acid; and
   filtering the precipitated scandium oxalate from the leach liquor.

2. The method of claim 1 wherein the red mud includes scandium, iron and titanium, further comprising extracting iron oxide and titanium oxide from the roasted red mud.

3. The method of claim 1 further comprising adding sulfuric acid to the red mud for converting oxides in the red mud to sulfates, the sulfates including iron, titanium and scandium.

4. The method of claim 3 wherein the roasting includes heating at least until iron sulfate and titanium sulfate form iron oxide and titanium oxide, respectively, and scandium sulfate and rare earth sulfates remain in solution.

5. The method of claim 4 wherein roasting occurs in a tube furnace, the tube furnace extracting sulfur trioxide and water vapors, the extracted sulfur trioxide unavailable for combination with the iron and titanium.

6. The method of claim 1 wherein the added acid performs sulphation, the sulphation and roasting results in undetectable levels of iron and titanium upon forming the leach liquor mixture, the levels being less than 5 ppm.

7. The method of claim 1 wherein the roasting occurs at temperatures in the range of 650° C. to 750° C.

8. The method of claim 1 wherein the roasting occurs at temperatures in the range of 700° C. to 715° C.

9. The method of claim 1 wherein adjusting the pH includes bringing the pH to around 8.0 for precipitating rare earths other than scandium.

10. The method of claim 9 further comprising adding sodium hydroxide to bring the pH to 8.0.

11. The method of claim 1 further comprising precipitating oxides including Y, La, Ce, Pr, Nd, Gd, Dy, Er, and Yb.

12. The method of claim 11 further comprising reducing the pH to 0.0 by adding $H_2SO_4$, and adding oxalic acid to bring the pH to 1.0.

13. The method of claim 1 wherein sulphating includes heating to between 100° C.-120° C. using a ratio of red mud to sulfuric acid to water of 1:0.8:0.4 for 18 hours to form metal sulfates, followed by roasting at a temperature >600° C. to decompose titanium and iron to oxide form.

14. A method for recovering scandium from red mud waste resulting from bauxite mining, comprising:
   sulphating the red mud by adding sulfuric acid for converting oxides to sulfates;
   roasting the sulphated red mud until less than 5 ppm iron sulfate and titanium sulfate remain;
   agitating a leach mixture including the roasted red mud by sonication or ball milling to leach scandium from the red mud into a leach liquor; and
   precipitating rare earths other than scandium from the leach liquor to generate a solution including scandium sulfate.

15. The method of claim 14 further comprising precipitating scandium oxalate from the scandium sulfate solution by adding oxalic acid.

16. In an aluminum/bauxite mining operation having a stream of red mud as a discarded byproduct, a method of processing and recovering scandium from the discarded red mud, comprising:
   gathering a quantity of red mud from a waste stream of byproducts resulting from bauxite mining;
   sulphating the quantity of red mud by adding sulfuric acid to convert oxides in the red mud to sulfates, the oxides including iron oxide and titanium oxide;
   roasting the sulphated red mud 700° C. for 1 hour in a tube furnace, the tube furnace providing ventilation for evacuating sulfates;

leaching scandium by adding water to the roasted red mud to form a leach mixture;

agitating the leach mixture by ball milling to expose crystalline structures of scandium to the water for leaching and resulting in a leach liquor including dissolved scandium and rare earths;

adjusting the pH of the leach liquor to 8.0 from addition of sodium hydroxide to precipitate rare earths and leave scandium in solution in the leach liquor;

filtering the precipitated rare earths to a filtrate including the dissolved scandium;

reducing the pH to 1.0 by addition of sulfuric acid; and adding oxalic acid to precipitate scandium oxalate.

17. The method of claim 1 wherein precipitating the scandium oxalate includes bringing the pH to between 0.0 and 1.0.

18. The method of claim 17 further comprising adding $H_2SO_4$ to reduce the pH, and adding oxalic acid to combine with the scandium in solution to precipitate the scandium oxalate.

* * * * *